US011140867B2

(12) United States Patent
Fregeau

(10) Patent No.: US 11,140,867 B2
(45) Date of Patent: Oct. 12, 2021

(54) BACK OR HIP TAG WITH IMPROVED MOISTURE RESISTANCE FOR TRACKING ANIMALS AND METHOD OF PRODUCING SAME

(71) Applicant: Microtraks, Inc., San Antonio, TX (US)

(72) Inventor: Michael Jordan Fregeau, Ashville, AL (US)

(73) Assignee: Microtraks, Inc., San Antonio, TX (US)

( * ) Notice: Subject to any disclaimer, the term of this patent is extended or adjusted under 35 U.S.C. 154(b) by 0 days.

(21) Appl. No.: 16/808,707

(22) Filed: Mar. 4, 2020

(65) Prior Publication Data

US 2020/0390060 A1 Dec. 17, 2020

Related U.S. Application Data

(60) Provisional application No. 62/862,009, filed on Jun. 14, 2019.

(51) Int. Cl.
| | |
|---|---|
| *G06K 5/00* | (2006.01) |
| *A01K 11/00* | (2006.01) |
| *G06K 19/07* | (2006.01) |
| *G06K 7/10* | (2006.01) |
| *G06Q 50/02* | (2012.01) |

(52) U.S. Cl.
CPC ........ *A01K 11/006* (2013.01); *G06K 7/10366* (2013.01); *G06K 19/0723* (2013.01); *G06Q 50/02* (2013.01)

(58) Field of Classification Search
CPC ...... A01K 29/005; A01K 11/008; A61B 7/04; A61B 5/14551; A61B 5/0402
USPC ........................ 235/380, 385, 462.46, 472.02
See application file for complete search history.

(56) References Cited

U.S. PATENT DOCUMENTS

| | | | | |
|---|---|---|---|---|
| 2009/0242647 | A1* | 10/2009 | Kim | G06K 19/07749 235/492 |
| 2009/0324981 | A1* | 12/2009 | Starkey | B32B 23/06 428/537.5 |
| 2010/0051701 | A1* | 3/2010 | Ogata | G06K 19/0775 235/492 |
| 2010/0059597 | A1* | 3/2010 | Iyengar | G06K 19/0776 235/492 |
| 2014/0338447 | A1* | 11/2014 | Sharpe | A61D 17/002 73/431 |
| 2015/0324760 | A1* | 11/2015 | Borowski | B65F 1/10 705/308 |
| 2018/0286035 | A1* | 10/2018 | Kozicki | G06T 7/0008 |

* cited by examiner

*Primary Examiner* — Daniel St. Cyr
(74) *Attorney, Agent, or Firm* — Dickinson Wright, PLLC; Stephen A. Mason; Jonathan H. Harder

(57) ABSTRACT

A tracking tag is disclosed that includes an identification tag fashioned from virgin paper, a pocket fashioned from the identification tag or adjacent the identification tag, the pocket housing a radio frequency identification (RFID) chip, and a laminate layer encasing the identification tag and pocket. A method of fashioning the tracking tag is also disclosed.

15 Claims, 7 Drawing Sheets

BACK OR HIP TAG WITH IMPROVED MOISTURE RESISTANCE FOR TRACKING ANIMALS AND METHOD OF PRODUCING SAME

CROSS-REFERENCE TO RELATED APPLICATIONS

The present application claims the benefit of U.S. Provisional Application No. 62/862,009, titled "BACK OR HIP TAG WITH IMPROVED MOISTURE RESISTANCE FOR TRACKING ANIMALS AND METHOD OF PRODUCING SAME" filed Jun. 14, 2019, the content of which is incorporated herein by reference in its entirety for all purposes.

TECHNICAL FIELD

This disclosure relates generally to technology for tagging and electronically tracking the movement of livestock and other animals. More specifically, the disclosure describes an animal back or hip tag comprising a tag assembly including a paper tag, a wireless communication product (e.g., radio-frequency identification (RFID) chip) encased in a pouch integrated with the paper tag or adjacent to the paper tag, and a moisture-resistant laminate layer positioned around all or part of the tag assembly.

BACKGROUND

In the field of animal tags, in particular RFID tags designed to be attached to an animal's back or hip, moisture from the animal's hide often interferes with the electronics of the RFID chip, effectively preventing the chip from being scanned or reducing the effective range of the scanning system.

Manufacturers of cattle back tags, for example, have attempted to remedy this design flaw by adding padding or other material to the back of their tags in order to raise the RFID electronics away from the surface of the animal's skin. These have met with mixed success with regard to limiting interference caused by hide moisture. Further, physically raising a tag off the surface of the animal's hide dramatically increases the likelihood of the tag being lost or damaged, for example by being scraped off of the animal.

SUMMARY

In general, the present disclosure describes an animal tracking skin tag and methods for producing same. According to some embodiments, the present disclosure provides a tag including ultra high frequency (UHF) technology such as RFID circuitry or other wireless communication product enclosed within a pouch attached to a paper identification tag. In some embodiments, an identification tag is fabricated using virgin paper, and the pouch enclosing the RFID circuitry affixed thereto. A thin laminate of a moisture-resistant material is applied to the pouch or the entire tag/pouch assembly. In some embodiments, the pouch may be a pocket fashioned out of the same paper as the identification tag, and thus, the pocket may be integrated with the identification tag. According to some embodiments, the RFID may be a strip inlay positioned lengthwise across the back of the tag, thus increasing the flexible strength of the tag.

The described tag assembly, according to some embodiments, allows for the entire tag assembly to remain a similar thickness to the paper portion of the tag itself, without the need to substantially build up the back of the tag to physically separate the tag from the animal, as in prior products. Tests of the example improved back tag show dramatically more reliable reading of the tag over previous tags, up to a 20-foot range. The improved tag has also demonstrated improved resistance to other environmental factors such as mud, manure, rain, and various other natural materials that might threaten to damage or interfere with an animal back or hip tag. The improved tag has also been shown to have improved longevity when subjected to the elements in the field.

BRIEF DESCRIPTION OF THE DRAWINGS

For a detailed description of example embodiments, reference will now be made to the accompanying drawings in which.

DETAILED DESCRIPTION

Figure 1:
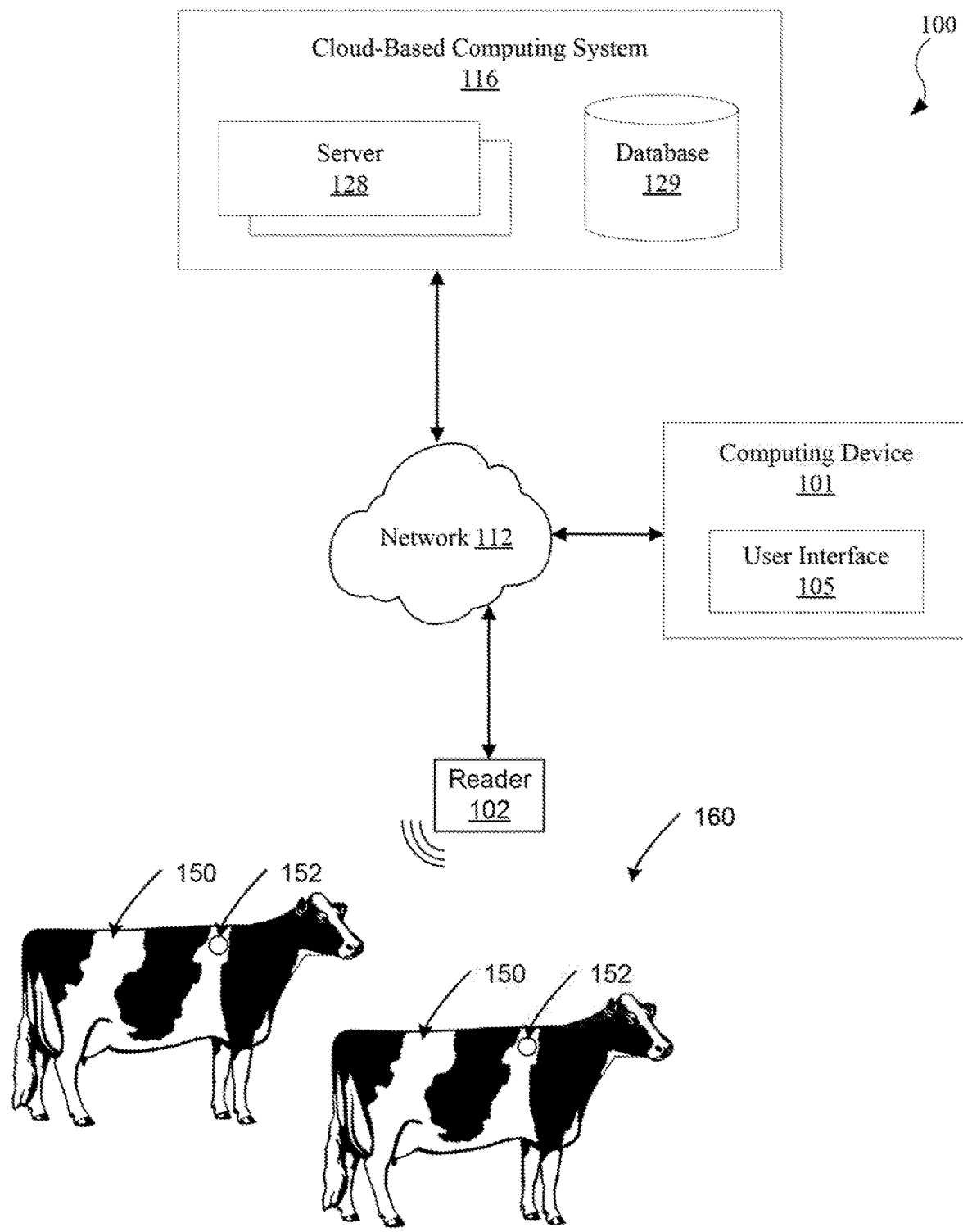
FIG. 1 illustrates a high-level component diagram of an illustrative system architecture according to certain embodiments of this disclosure.

FIG. 1 illustrates a high-level component diagram of an illustrative system architecture 100 according to certain embodiments of this disclosure. In some embodiments, the system architecture 100 may include a computing device 101, a reader 102, and/or a cloud-based computing system 116 that are communicatively coupled via a network 112. As used herein, a cloud-based computing system refers, without limitation, to any remote or distal computing system accessed over a network link. Each of the computing device 101 and reader 102 may include one or more processing devices, memory devices, and network interface devices.

The network interface devices of the computing device 101 and the reader 102 may enable communication via a wireless protocol for transmitting data over short distances, such as Bluetooth, ZigBee, near field communication (NFC), etc. Additionally, the network interface devices may enable communicating data over long distances, and in one example, the computing device 101 and/or the reader 102 may communicate with the network 112. Network 112 may be a public network (e.g., connected to the Internet via wired (Ethernet) or wireless (WiFi)), a private network (e.g., a local area network (LAN), wide area network (WAN), virtual private network (VPN)), or a combination thereof.

The reader 102 may include an integrated long-range antenna that supports a read range up between 100-600 feet. In some embodiments, the reader 102 may include high-performance ASIC radio technology to provide higher throughput so tracking animals 150 (e.g., cattle) via their back or hip tracking tags 152 may be performed more quickly and accurately. The reader 102 may include a display screen (e.g., touchscreen) that includes a light emitting diode (LED) screen to display information pertaining to a back or hip tracking tag 152 read, such as the identification of the animal, a vaccine history of the animal, a birthdate of the animal, a location of the cattle, a sex of the animal, and so forth. The reader 102 may also include a physical keypad for a user to enter alphanumeric characters as desired.

The reader 102 may be a handheld device or included in a larger system that is located at a desired place to monitor animals to which back and/or hip tracking tags 152 are affixed. For example, the reader 102 may be included in the computing device 101 that is located at a desired position on a ranch to monitor cattle as they ingress and egress certain areas.

The computing device 101 may be any suitable computing device, such as a laptop, tablet, smartphone, server, or computer. The computing device 101 may run a user interface 105 that is implemented in computer instructions stored on a memory device and that is executed by a processing device. The user interface 105 may present information pertaining to a back or hip tag read, such as the identification of the animal, a vaccine history of the animal, a birthdate of the animal, a location of the cattle, a gender of the animal, and so forth.

Although just one reader 102 and computing device 101 are shown, it should be understood that there may be numerous readers 102 and/or computing devices 101 operated at a location 160 including animals 160. In some embodiments, the reader 102 may transmit data read from the back or hip tags 152 to the cloud-based computing system 116 and/or the computing device 101 for processing.

In some embodiments, the cloud-based computing system 116 may include one or more servers 128 that form a distributed, grid, and/or peer-to-peer (P2P) computing architecture. Each of the servers 128 may include one or more processing devices, memory devices, data storage, and/or network interface devices. The servers 128 may be in communication with one another via any suitable communication protocol. The servers 128 may use a database 129 that stores the identifications associated with the animals being monitored and various information pertaining to those animals, such as their identification number, name, date of birth, vaccine history, sire, location, medical history, place of origin, owner, ranch or farm name, and the like.

In some embodiments, the server 128 may perform analysis based on the location of the animals determined via the data received from the reader 102. For example, the server 128 may determine an animal is near a hazard and provide an alert to the reader 102 and/or the computing device 101 to indicate the same. In some embodiments, the server 128 may determine that cattle has left their designated roaming area and provide an alert to the reader 102 and/or the computing device 101. In other instances, the server 128 may determine that cattle has a vaccine that is expired and needs to be re-administered based on the information stored in the database 129 that is correlated with the data received from the reader 102.

Tracking Tag Specification

The following tracking tag specification described below and depicted in FIGS. 2A-2D and 4 is merely exemplary, and the exact dimensions shall not be construed to be the only dimensions disclosed. It will be apparent to one having ordinary skill in the art that similar tag assemblies adhering to the principles of the subject matter disclosed here may differ across various dimensions and nevertheless still embody the subject matter disclosed herein. For example, in some embodiments, a tracking tag according to this disclosure may be about ¼ of one inch wider than current common tags to allow for the accommodation of the RFID chip in an integrated pocket with the tag. However, it will be apparent to one having ordinary skill in the art that a tag assembly according to this subject matter differs from the detailed dimensions of described below—for instance by being wider, narrower, longer, shorter, or varying somewhat in thickness—may nevertheless be a tag assembly manufactured and functioning according to the inventions disclosed herein.

Figure 2A:
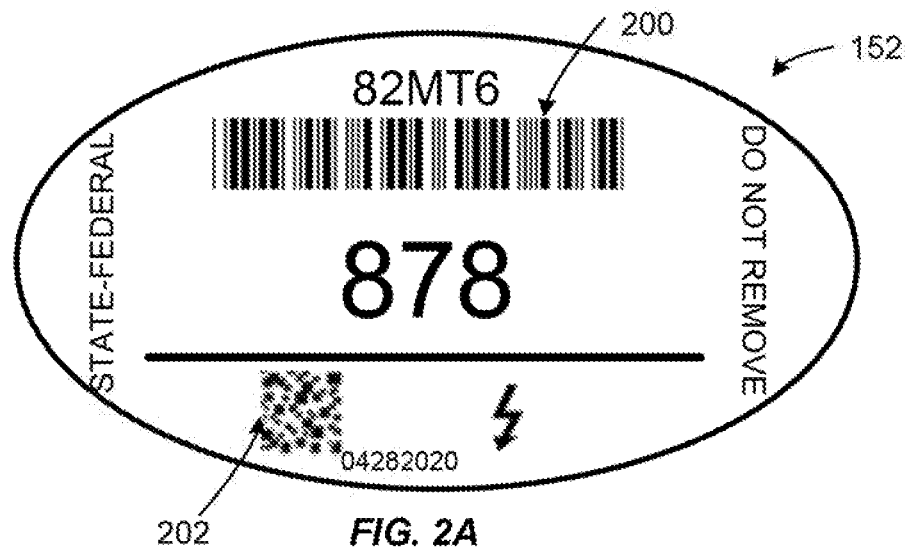
FIGS. 2A-2B illustrate a front side of various example tracking tags according to certain embodiments of this disclosure.
Figure 2B:
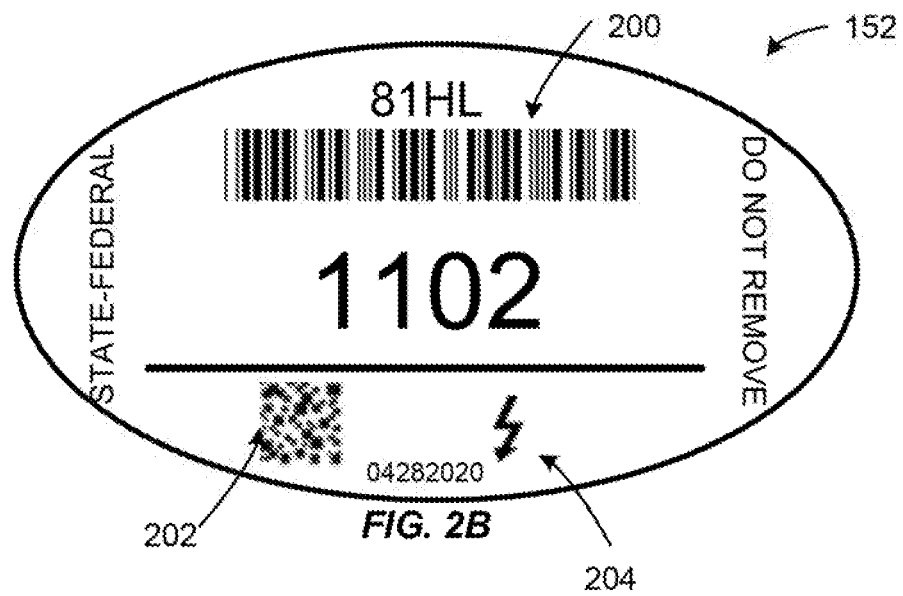

Regarding color, in some embodiments the tracking tags 152 may be white (R:250, G:250, B:250) or yellow (R:245, G:250, B:75) on a printed side with black printing. FIGS. 2A and 2B depict a printed (or front) side of a tracking tag 152. The tracking tag may include an identification tag made of virgin paper. Virgin paper may use virgin fibers that create paper with higher absorbency rates, better ink color and retention, and softer and more durable options.

Regarding shape, in some embodiments the tracking tags 152 may be oval in shape 3 inches high by 3¾ inches wide as shown in FIGS. 2A and 2B. The long dimension of the training tag 152 may be parallel to the grain of the paper. The large 3 (e.g., "878" of FIG. 2A) or 4 (e.g., "1102" of FIG. 2B) digit numbers may be positioned in the middle of the tracking tag. A solid black bar, ⅛ inch high may be ⅛ inch below the large numbers. The production date (e.g., "04282020" in FIGS. 2A and 2B) may be ¹¹⁄₁₆ inch high and located below the bottom bar code. On the left end of the tracking tag 152 the legend "State-Federal" may be printed. On the right end of the tag the legend "Do Not Remove" may be printed. The legend printing may be ⅛ inch high. Slight deviations from the standard dimensions may be allowed to accommodate inlay placement and die cutting allowances.

Regarding material, in some embodiments, the tracking tags 152 may be made of a waterproof paper stock and of sufficient wet strength and size, and an additive shall be included in the manufacture of the tracking tag 152 to ensure the tracking tag 152 does not curl when placed in a humidity chamber at 83° F. and 83 percent relative humidity for 24 hours. In some embodiments, the tracking tag 152 withstands adverse weather conditions (extreme temperature, rain, snow and high humidity) for at least 14 days without degradation.

Figure 2C:
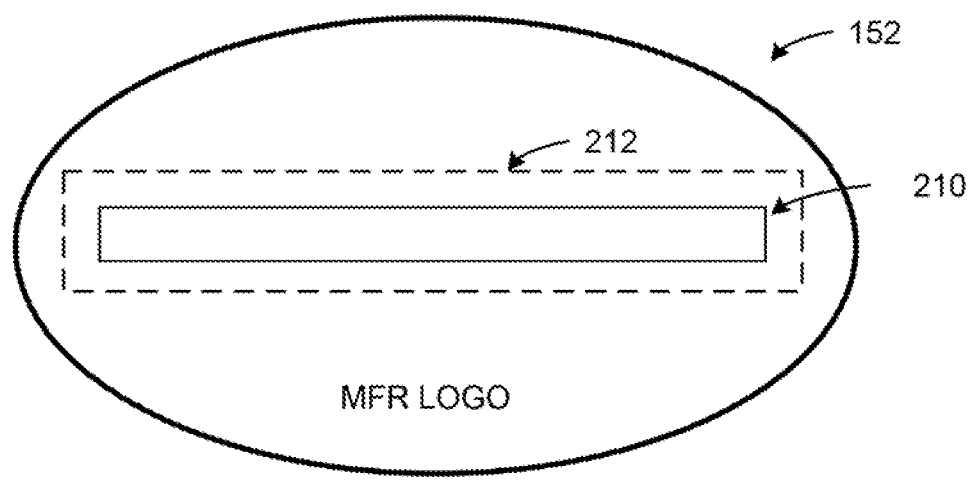
FIGS. 2C-2D illustrate a back side of various example tracking tags according to certain embodiments of this disclosure.
Figure 2D:
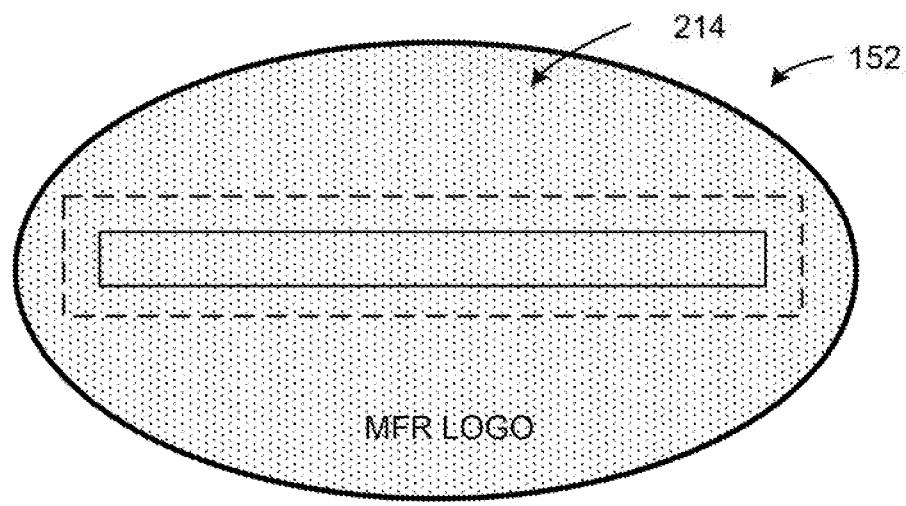

Regarding print specifications, in some embodiments the front side of the tracking tags 152 may be printed in accordance with the specifications and a logo or trademark of the manufacturer may be easily observed on the backside of the tracking tag 152 (e.g., as shown in FIGS. 2C and 2D). In some embodiments, a silhouette of a cow (not shown) showing tracking tag placement may be printed on the backside of the tracking tag 152. All printing may be with permanent, black ink and modified Gothic Type Style, although other colors and types of font may be used. The ink may not offset or smear when tracking tags 152 are padded together or when tracking tags 152 are wet. The tracking tags 152 may have a total of 10 characters. At the option of a requestor, tracking tags 152 may have either three or four large digits, serially numbered. Tracking tags 152 with three large digits may have a prefix consisting of two numbers and two letters followed by one number, which may be serially numbered with the large digit numbers. Tracking tags with four large digits may have a prefix printed consisting of two numbers and two letters.

Regarding character rand numeral printing sizes, in some embodiments the prefix digits remain constant or may change alphabetically with every 10,000 tracking tags. The prefix numbers consist of the following (i) the first two characters are numeric and designate the state code, (ii) the next two characters are alphas and designate either livestock market, (iii) code or state roll over code, (iv) the next character is a digit and may be either small number that is printed in the prefix section or large size number and designates the first serial character in the numeric series from 0001 to 0000 (where "0000" is the 10 thousandth tag). Prefix numbers and letters may be in boldface Gothic Type Style and be ¼ inch high. The large 3 or 4 digit numbers may be 1¼ inches high and a minimum of ¼ inch wide boldface. There may be at least 3/16 inch space between each number. The number may be vertical with no protrusion to the left.

Regarding bar codes on the tracking tags 152, there may be two types of bar codes as depicted in FIGS. 2A and 2B. A top bar code 20 may be linear, 1 13/16 to 2 inches long and 7/16 inch high. A bottom bar code 202 may be a 2D data matrix code measuring ½ inch square and centered on the left half of the tracking tag 152 below the three or four large numbers of the tracking tag 152 and horizontally aligned with a UHF icon 204 that is centered on the right half. The UHF icon 204 indicating that UHF RFID technology is being used by the tracking tag 152. The bar codes may be clearly distinguishable from the large numbers with at least ⅛ inch clearance. The linear bar code may be a code 39 and have a density of 6 characters per inch. The bar coding meets the American National Standards Institute (ANSI) standards grade of "B" or better. Each bar code will be encoded with the alpha/numeric identification characters visually present and encoded on (and in the RFID chip—UHF) the tracking tag 152.

Regarding the UHF icon 204, in some embodiments, the UHF icon 204 may be imprinted adjacent to the 2D bar code on the right side of the 2D bar code at the height of ½ inch.

Further regarding FIG. 2C, a wireless communication product (e.g., RFID chip) 210 is depicted on a backside of the tracking tag 152. Further, the RFID chip 210 may be capable of exchanging data with the reader 102 using radio frequency signals. In some embodiments, the RFID chip 210 may include a built-in antenna and an integrated circuit. The antenna may send and receive radio waves, while the integrated circuit may modulate and demodulate the radio signals, as well as processing and/or storing data. For example, the RFID chip 210 may have the identification of the animal encoded thereon.

The RFID chip 210 is disposed within a pouch 212 that is fashioned on the back of the tracking tag 152. As depicted, RFID chip 210 is positioned as an inlay strip lengthwise across a portion of the length of the tracking tag 152. In some embodiments, positioning the RFID chip 210 in this manner may increase the durability and/or stiffness of the tracking tag 152. The pouch 212 may not substantially add to the width of the paper identification tag to which the pouch 212 is fashioned. The pouch 212 may totally enclose the RFID chip 210 such that it is not exposed to outside elements.

As depicted in FIG. 2), the tracking tag 152 is covered in a moisture-resistant material (represented by dots 214) that is applied over the entire tracking tag (e.g., including the paper identification tag and the pouch 212). In some embodiments, the moisture-resistant material 214 may just be applied to cover the pouch 212.

Figure 3A:
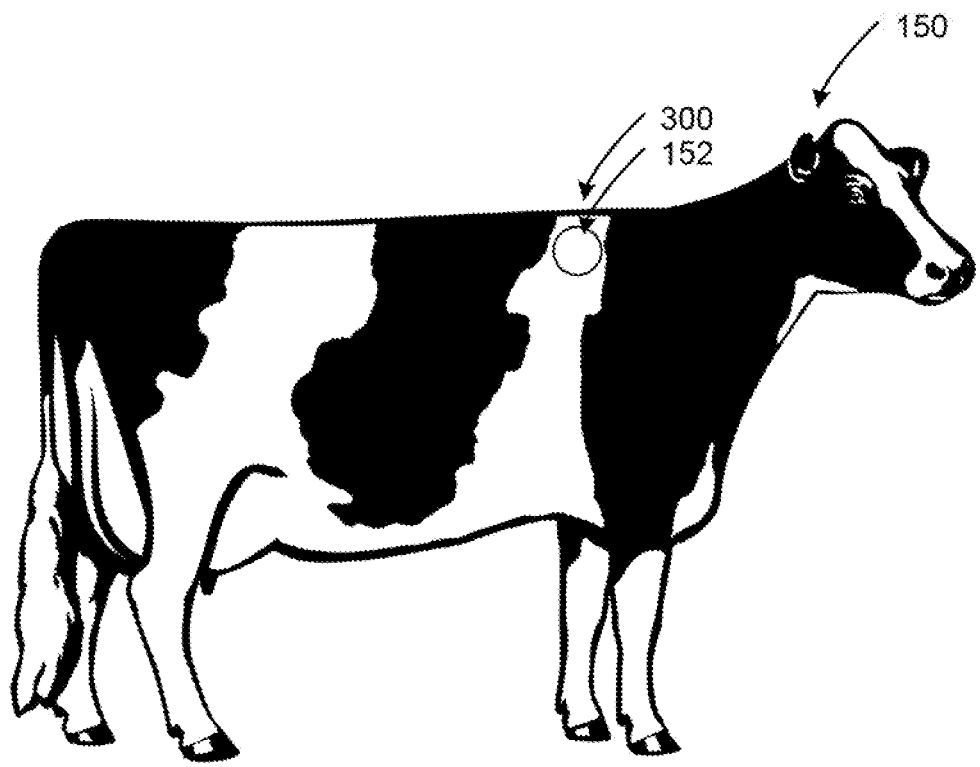
FIG. 3A-3B illustrate example placement locations of the back tag or hip tag on cattle according to certain embodiments of this disclosure.
Figure 3B:
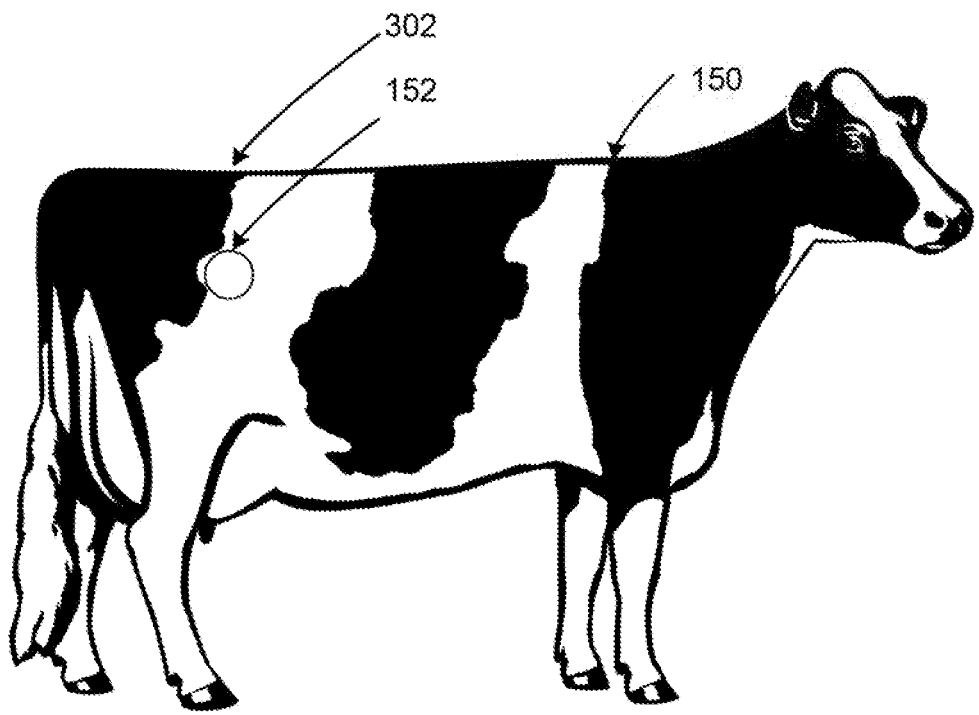
Figure 4:
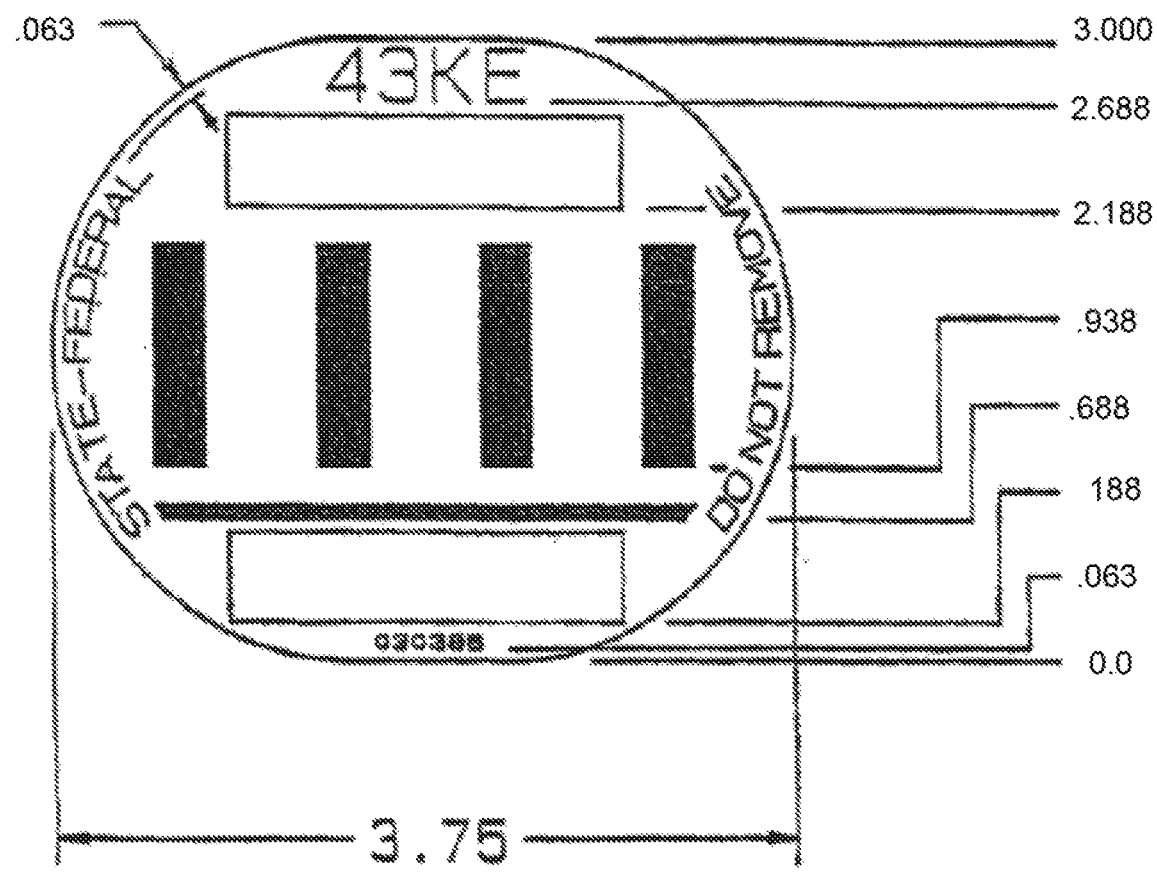
FIG. 4 illustrates an example measurements for a layout of a paper tracking tag according to certain embodiments of this disclosure.

FIG. 3A-3B illustrate example placement locations of the back tag or hip tag on cattle according to certain embodiments of this disclosure. In FIG. 3A, the tracking tag 152 is placed on a back 300 of the animal 150. In FIG. 3B, the tracking tag 152 is placed on a hip 302 of the animal 150. The tracking tag 152 may be placed on the back 300 or hip 302 using an adhesive (e.g., certain type of glue or cement) that secures to the hair and/or skin of the animal 150. In some embodiments, the tracking tag 152 may be secured to the back 300 or hip 302 using a mechanical attachment.

Method of Fashioning a Tracking Tag

Figure 5:
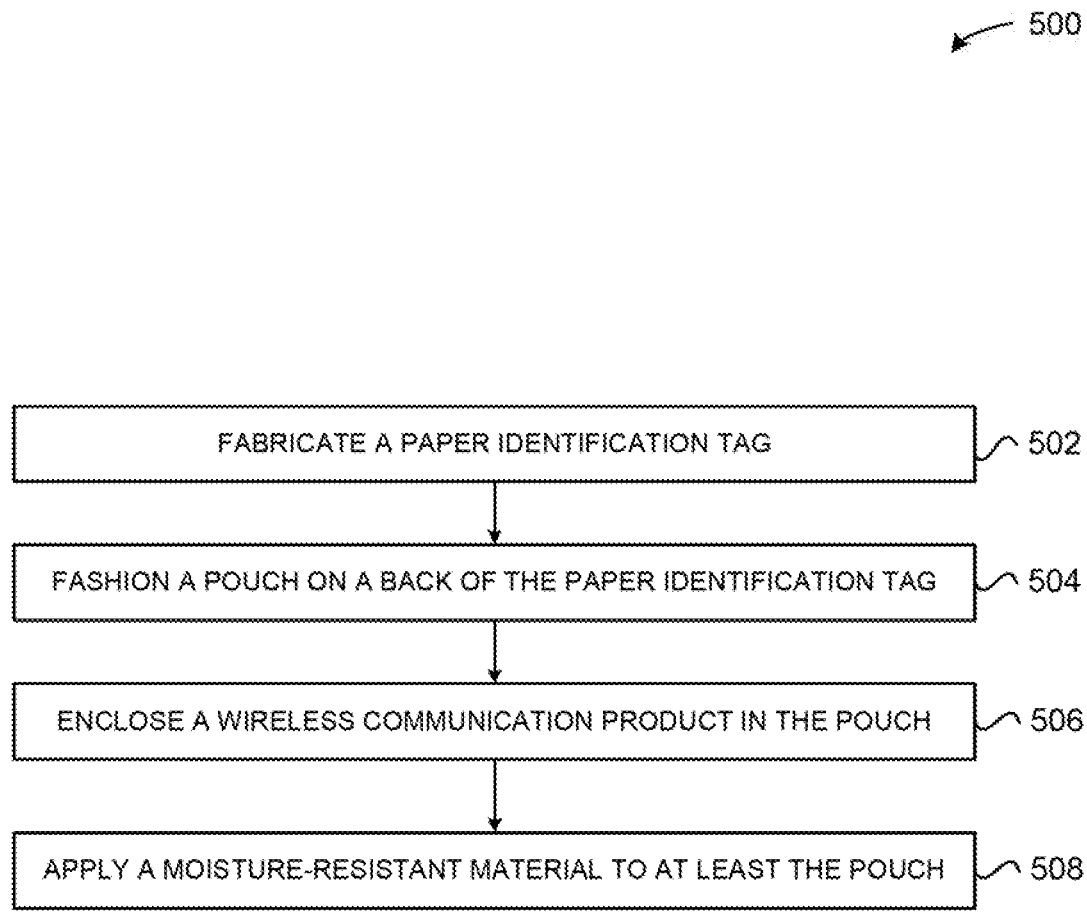
FIG. 5 illustrates a method for fashioning a tracking tag according to certain embodiments of this disclosure.

FIG. 5 illustrates a method 500 for fashioning a tracking tag according to certain embodiments of this disclosure. In some embodiments, the method 500 may be performed by one or more processing devices. For example, a manufacturing line in a manufacturing plant may include one or more computing devices storing computer instructions on one or more memory devices and executed by one or more processing devices. The computer instructions may cause the one or more processing devices to perform any combination of the operations described below when executed.

At block 502, a paper identification tag may be fabricated. The paper identification tag may be fabricated based on certain measurements for the visual graphics printed on the paper identification tag.

At block 504, a pouch may be fashioned. In some embodiments, the pouch may be fashioned on the back of the paper identification tag by fashioning a pocket that is integrated with the paper identification tag. That is, the pocket is fashioned using the same paper as the identification tag. In some embodiments, the pouch may be fashioned on the back of the paper identification tag by attaching the pouch on the back of the paper identification tag. The pouch may be attached to the back of the paper identification tag using an adhesive and/or mechanical attachment. The pouch may be positioned on the back of the paper identification tag that is in contact with a hide (e.g., hair and/or skin of the animal) of an animal, and the pouch may be opposite a front of the paper identification tag that includes at least one identifier associated with the animal.

At block 506, a wireless communication product (e.g., RFID chip) may be enclosed in the pouch. The RFID chip may use UHF technology to communicate wirelessly with a reader. In embodiments where the pouch is initially separate from the paper identification tag, the RFID chip may be disposed in the pouch such that the RFID chip is an inlay strip lengthwise across the back of the paper identification tag when the pouch is attached to the paper identification tag. In embodiments where the pouch includes a pocket integrated with the paper identification tag, the RFID chip may be disposed in the pocket such that the RFID chip is an inlay strip lengthwise across the back of the paper identification tag. In either embodiments, the RFID chip strip inlay may be positioned within a range between 60-100 percent of an entire length of the back of the paper identification tag to provide additional support to the paper identification tag. Using the disclosed techniques by disclosing the RFID chip in the pouch, the RFID chip may be readable by a reader up to 20 feet away from the reader.

At block 508, a moisture-resistant material may be applied to at least the pouch. In some embodiments, the moisture-resistant material may be applied to the entire tag assembly including the paper identification tag and the pouch.

Computer System

Figure 6:
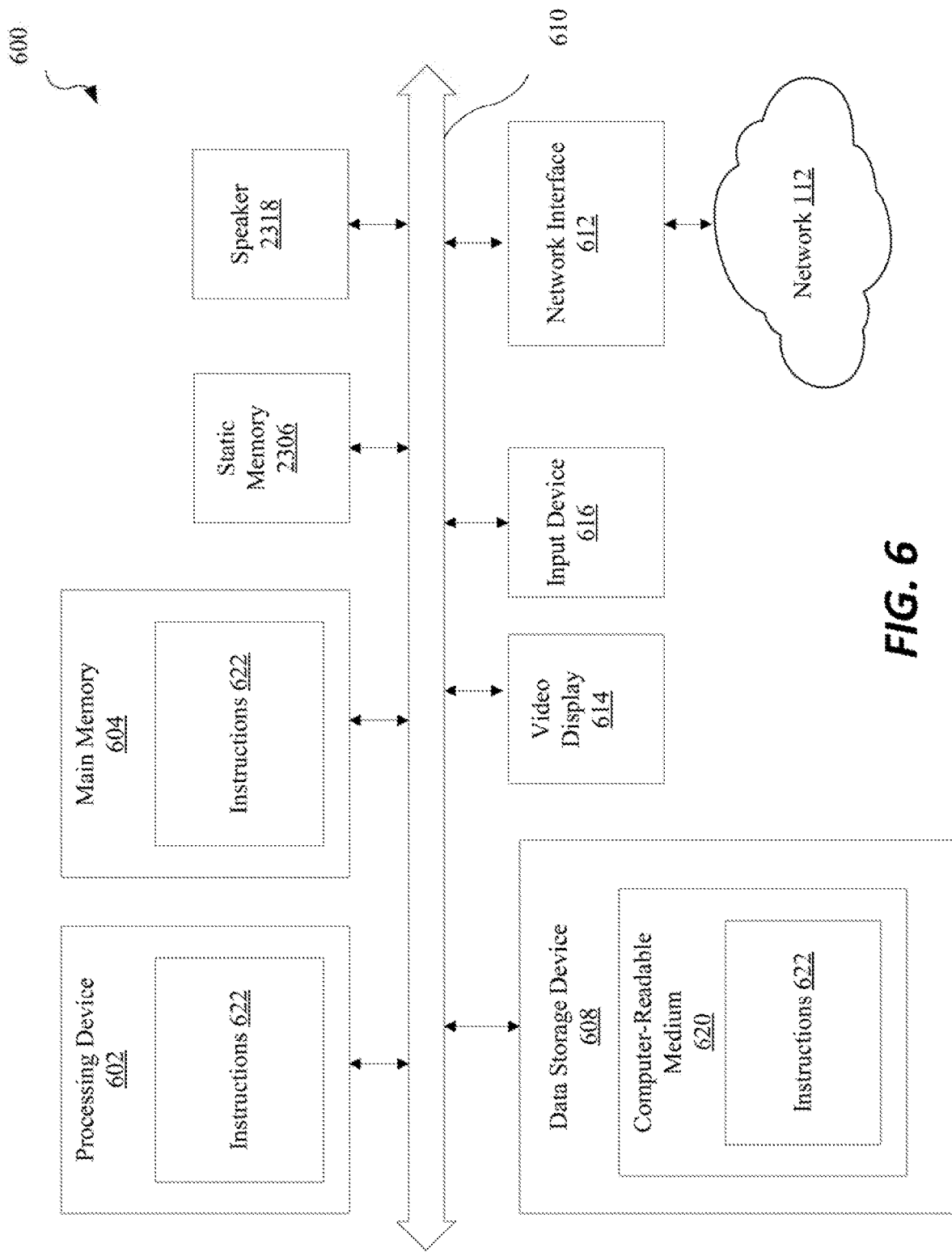
FIG. 6 illustrates an example computer system.

FIG. 6 illustrates an example computer system. In one example, computer system 600 may correspond to the computing device 101, reader 102, or one or more servers 128 of the cloud-based computing system 116 of FIG. 1. The computer system 600 may be capable of executing the user interface 105 of FIG. 1. The computer system 60 may be connected (e.g., networked) to other computer systems in a LAN, an intranet, an extranet, or the Internet. The computer system 600 may operate in the capacity of a server in a client-server network environment. The computer system 600 may be a personal computer (PC), a tablet computer, a server, a wearable (e.g., wristband), a set-top box (STB), a personal Digital Assistant (PDA), a mobile phone, a camera, a video camera, or any device capable of executing a set of instructions (sequential, parallel, or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 600 includes a processing device 602, a main memory 604 (e.g., read-only memory (ROM), solid state drive (SSD), flash memory, dynamic random access memory (DRAM) such as synchronous DRAM (SDRAM)), a static memory 606 (e.g., solid state drive (SSD), flash memory, static random access memory (SRAM)), and a data storage device 608, which communicate with each other via a bus 610.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions for performing any of the operations and steps discussed herein.

The computer system 600 may further include a network interface device 612. The computer system 60 also may include a video display 614 (e.g., a liquid crystal display (LCD) or a cathode ray tube (CRT)), one or more input devices 616 (e.g., a keyboard and/or a mouse), and one or more speakers 618 (e.g., a speaker). In one illustrative example, the video display 614 and the input device(s) 616 may be combined into a single component or device (e.g., an LCD touch screen).

The data storage device 616 may include a computer-readable medium 620 on which the instructions 622 embodying any one or more of the methodologies or functions described herein are stored. The instructions 622 may also reside, completely or at least partially, within the main memory 604 and/or within the processing device 602 during execution thereof by the computer system 600. As such, the main memory 604 and the processing device 602 also constitute computer-readable media. The instructions 622 may further be transmitted or received over a network 112 via the network interface device 612.

While the computer-readable storage medium 620 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

What is claimed is:

1. A tracking tag comprising:
    an identification tag fashioned from virgin paper for durability;
    a pocket fashioned from the identification tag or adjacent the identification tag, the pocket housing a radio frequency identification (RFID) chip, wherein the RFID chip is a strip inlay positioned, within the pocket, lengthwise across a back of the identification tag; and
    a laminate layer encasing the identification tag and pocket,
    wherein the pocket is located on a back of the identification tag that contacts a hide of an animal, and is opposite a front of the identification tag that comprises at least one identifier associated with the animal.

2. The tracking tag of claim 1, wherein the strip inlay is positioned, within the pocket, within a range between 70-95 percent of an entire length of the back.

3. The tracking tag of claim 1, wherein the RFID chip uses ultra high frequency technology to communicate wirelessly with a reader.

4. The tracking tag of claim 1, wherein the RFID chip is readable by a reader up to 20 feet away from the reader.

5. The tracking tag of claim 1, wherein the pocket including the RFID chip adds less than ¼ of one inch to a width of the identification tag.

6. The tracking tag of claim 1, wherein the tracking tag is positioned on a back of an animal or on a hip of the animal.

7. The tracking tag of claim 1, wherein the pocket is integrated with the identification tag.

8. The tracking tag of claim 1, wherein the pocket is secured to the identification tag using an adhesive.

9. A method for fashioning a tracking tag, the method comprising:
    fabricating a paper identification tag, wherein the paper identification tag is made of virgin paper for durability;
    fashioning a pouch on a back of the paper identification tag;
    enclosing a wireless communication product in the pouch, wherein the wireless communication product comprises a radio frequency identification (RFID) chip;
    positioning the wireless communication product within the pouch lengthwise across the back of the paper identification tag, wherein the wireless communication product is a strip inlay, wherein the pouch is positioned on the back of the paper identification tag that is in contact with a hide of an animal, and the pouch is opposite a front of the paper identification tag that comprises at least one identifier associated with the animal; and
    applying a laminate layer encasing the paper identification tag and pouch.

10. The method of claim 9, wherein fashioning the pouch on the back of the paper identification tag further comprises fashioning a pocket that is integrated with the paper identification tag.

11. The method of claim 9, wherein fashioning the pouch on the back of the paper identification tag further comprises attaching the pouch on the back of the paper identification tag.

12. The method of claim 11, wherein the pouch is secured to the paper identification tag using an adhesive.

13. The method of claim 9, wherein the strip inlay is positioned, within the pouch, within a range between 70-95 percent of an entire length of the back.

14. The method of claim 9, wherein the RFID chip uses ultra high frequency technology to communicate wirelessly with a reader.

15. The method of claim 9, wherein the wireless communication product is readable by a reader up to 20 feet away from the reader.

* * * * *